United States Patent Office 3,832,267
Patented Aug. 27, 1974

3,832,267
EMBOSSED FILM
Chia-Seng Liu, Newark, Del., assignor to
Hercules Incorporated, Wilmington, Del.
Filed Sept. 19, 1972, Ser. No. 290,309
Int. Cl. B29g 7/24
U.S. Cl. 161—116    3 Claims

ABSTRACT OF THE DISCLOSURE

Embossed, biaxially oriented propylene polymer films having great tear strength for their thickness can be prepared if certain critical limitations are followed. The process comprises embossing a sheet of propylene polymer having a crystallinity of from about 40% to 65% and containing at least 80% of repeating units derived from propylene monomer to a depth of from about 50% to 75% of its thickness with at least 4 but not more than 600 uniform raised bosses per square inch, each boss enclosed by a raised lip, the valley areas separating individual bosses constituting from about 20% to 40% of the surface of the embossed film and subjecting the thus embossed film to biaxial drawing of at least 2.5 to 5.0 times in both the machine and cross-machine directions.

---

This invention relates to embossed plastic film. More particularly, this invention relates to biaxially oriented embossed propylene polymer film of certain properties and configuration and its process of preparation.

It is known, as shown in U.S. Pat. No. 3,137,746 to Seymour et al., to emboss various thermoplastic film, the embossments being, for example, hexagonal raised figures separated by valley areas and to biaxially draw the thus embossed film. However, the prior art embossed films preferentially draw in the valley areas, split and form netlike material.

It has now unexpectedly been found that by adhering to certain critical limitations, propylene polymer films can be embossed and biaxially drawn to form oriented imperforate films of novel configuration having advantageous and unusual properties. Specifically, the process in accordance with this invention comprises embossing a sheet of propylene polymer having a crystallinity of from about 40% to about 65% and containing at least about 80%, most preferably at least 90% of repeating units derived from propylene monomer to a depth of from about 50% to about 75% of its thickness with at least 4 but not more than about 600 uniform raised bosses per square inch, each boss enclosed by a raised lip or ridge, the valley areas separating individual bosses constituting from about 20% to about 40% of the surface of the embossed film and subjecting the thus embossed film to a biaxial draw of at least about 2.5 times to about 5.0 times in both the machine and cross-machine directions. The unique film of this invention resulting from the above process comprises a biaxially oriented embossed propylene polymer film having a thickness no greater than 5 mils at the thickest point, comprising a plurality of uniform rows of enclosed depressions, each depression being enclosed by a ridge at least 3 times the thickness of the depression and each ridge enclosed depression being separated from adjacent ridge enclosed depressions by a valley area having a thickness less than the thickness of the depression, there being between about 1 and about 240 enclosed depressions per square inch and said propylene polymer having a crystallinity of from about 40% to about 65%. The unique film of this invention has a very attractive appearance and a higher gas permeability than has heretofore been obtainable with film of this strength. It has greater tear strength, less rattle (noise) and is softer than biaxially oriented flat film of the same weight. In particular, the tongue tear strength of the film of this invention will be many times, often 10 or 20 times, greater than that of unembossed flat film of equal weight and same polymer composition. The film of this invention is particularly desirable for use as barrier film in surgical and feminine hygiene pads, for packaging items to be sterilized with ethylene oxide gas and in decorative packaging.

As indicated above, the ability to obtain this desirable type of film depends upon a number of critical limitations. These limitations are enumerated below:

(1) The polymer used in making the film will preferably be polypropylene. It must have a percent crystallinity of from about 40 to about 65 and contain at least 80%, most preferably 90%, of repeating units derived from propylene monomer. While polypropylene is preferred, random copolymers containing not more than 10% and block copolymers containing not more than 20% of repeating units derived from other $\alpha$-olefin monomers, such as ethylene, butene, etc. can be used.

If the crystallinity of the polymer is much higher than 65%, the embossed film will tend to split and form a net when biaxially drawn. If the crystallinity of the polymer is much less than 40%, the resulting drawn film lacks sharply defined ridges, depression and valleys and has a low tear strength.

(2) The propylene polymer film must be embossed to a depth of from about 50% to about 75% of its thickness. If the embossment is much more than 75% the bosses fail to draw and/or the film tears during orientation. If the embossment is much less than 50%, insufficient polymer is displaced to form strong lips or ridges around the edge of the bosses and the tear strength of the resulting oriented film is low.

(3) The film must be embossed in such a way as to form a strong lip or ridge enclosing each raised boss. This will normally occur if the film is embossed to a depth of from about 50% to about 75% as described in (2) above, provided that the polymer is not pressed all the way to the bottom of the cavity during embossment. By the term "strong lip or ridge" is meant an area enclosing each boss having a thickness at least 1.2 times the thickness at the center of the boss.

(4) The embossed film must contain not more than about 600 uniform raised bosses per square inch before drawing. While a lower limit does not seem to be critical, embossments fewer than about 4 per square inch become impractical since the ridges are too far apart to act as tear stoppers. If the embossments are increased to more than 600 per square inch, the tear strength of the oriented film decreases.

(5) The valley area separating individual bosses must constitute from about 20% to about 40% of the surface of the embossed film before drawing. If the valley area constitutes much less than 20% insufficient polymer may be displaced to form a strong lip or ridge enclosing each boss. If the valley area constitutes much more than 40%, embossing pressures become excessive.

(6) The embossed film, before drawing, must have a thickness no greater than about 18 mils at the thickest point. If the thickness is much greater than 18 mils, inadequate quenching occurs and the desired type of orientation is not obtained. A minimum thickness does not appear to be critical. However, a thickness of at least about 1 mil is desirable.

(7) The embossed film must be biaxially drawn in the range of from about 2.5 times to about 5.0 times. While it is most desirable that the embossed film be drawn the same number of times in both the machine and cross-machine directions, good results are obtained if, for example, it is drawn 4 times in one direction and only 3 times in the other. Drawing less than 2.5 times results in nonuniform orientation with unoriented bosses and low tear strength, while drawing much more than about 5 times results in the formation of many film splits.

In order that this invention may be better understood, it will be described with reference to the drawings, which are given by way of example only and in which.

For convenience of illustration, the thickness of the materials shown in the figures have been exaggerated in relation to the other dimensions.

Figure 1:
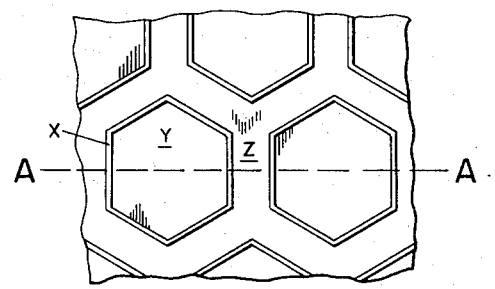
FIG. 1 is a plan of a portion of a hexagonally embossed film, to an enlarged scale, before biaxially drawing.
Figure 2:
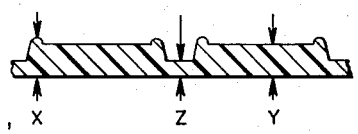
FIG. 2 is a cross-sectional elevation of FIG. 1 along the line A—A.
Figure 3:
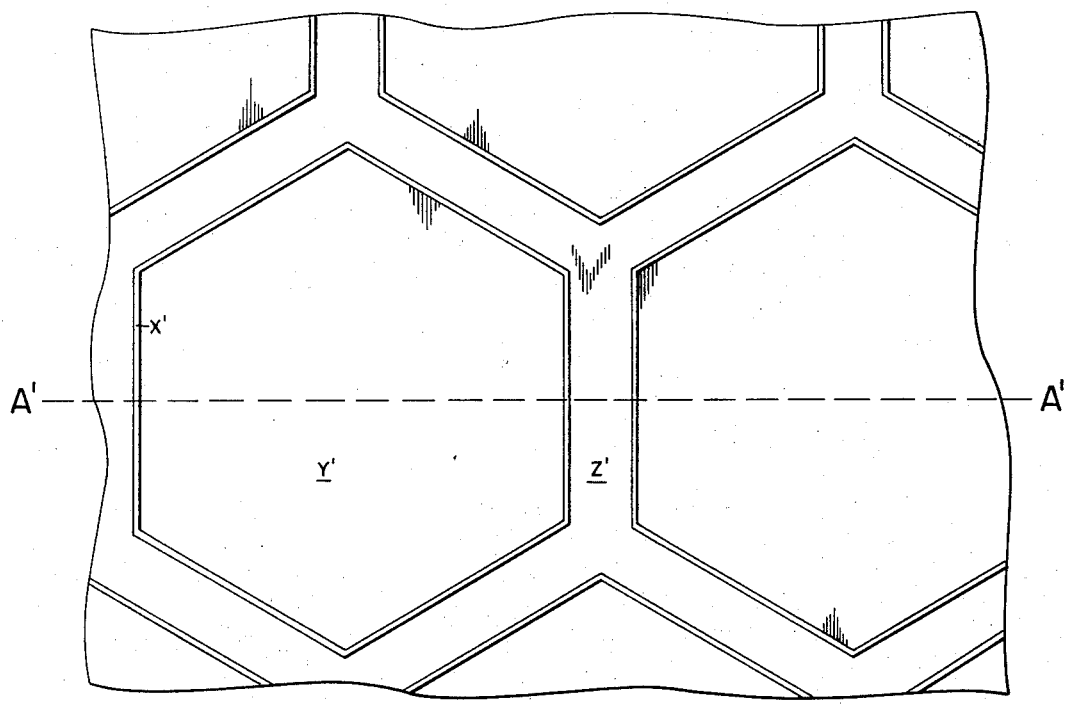
FIG. 3 is a plan of a portion of the film from FIG. 1 after biaxially drawing approximately 4 times in each direction.
Figure 4:
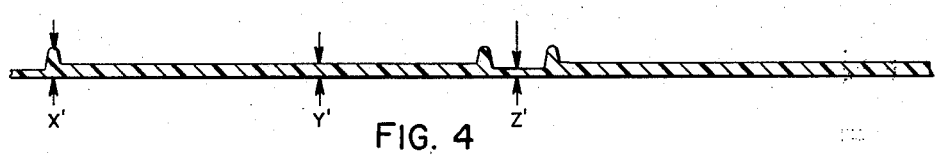
FIG. 4 is a cross-sectional elevation of FIG. 3 along the line A'—A'.
Figure 5:
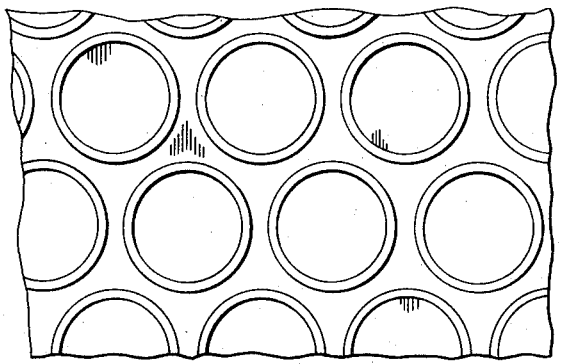
FIGS. 5, 6 and 7 represent portions of embossed films with circular, square and triangular configurations to an enlarged scale, before biaxially drawing.
Figure 6:
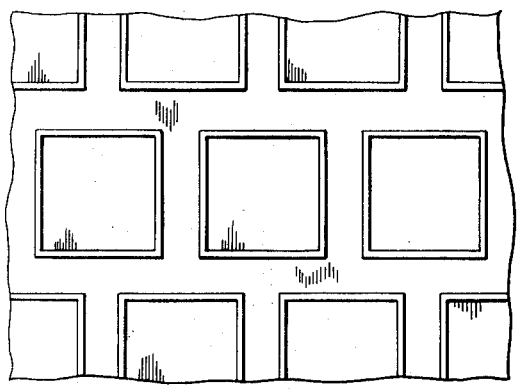
Figure 7:
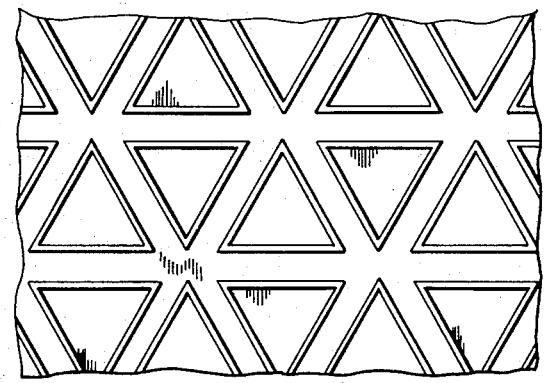

In FIGS. 1, 2, 3 and 4, an embossed film having uniform hexagonal bosses arranged in parallel rows, each boss Y being enclosed by a lip or ridge X and separated from other bosses by a valley area Z, is biaxially drawn about 4 times in each direction to form an embossed film having enclosed hexagonal depressions Y', each depression enclosed by a ridge X' and separated from other enclosed depressions by a valley area Z'. The ratio of the thickness at X to the thickness at Y will be at least 1.2. The ratio of the thickness at X' to the thickness at Y' will be a least 3.0.

While only hexagonal, circular, square and triangular raised bosses are shown in the drawings, it will be obvious to those skilled in the art that other configurations can be used.

The mechanical means of embossing a propylene polymer film and biaxially drawing the thus embossed film is well known in the art and need not be described in detail here. It is sufficient for purposes of describing this invention to point out that the flat film to be embossed can either be a film in the melt as it comes from an extruder or a preheated previously extruded or cast flat film. Generally, the film will be embossed by passing the molten film between the nip of two rollers, one of which is an embossing roll and the other of which is a chill roll with a smooth surface. The chill roll will be maintained around 30° C. and the embossing roll around 40° C. The thus embossed film will generally be biaxially drawn at temperatures in the range of about 130° C. to about 150° C. using differential speed rolls for drawing in the machine direction and tenters for drawing in the cross-machine direction. Most preferably, the machine and cross-machine drawing will be carried out sequentially, however, it can be done simultaneously.

The following examples will serve to illustrate the invention.

Example 1

This example shows the preparation of biaxially oriented embossed film in accordance with this invention and the criticality of employing propylene film having a crystallinity between 40% and 65%.

A sample of ethylene-propylene copolymer having a molecular weight of approximately 290,000, a 50% crystallinity and containing approximately 97% of repeating units derived from propylene monomer and 3% derived from ethylene monomer is melt-extruded through a 15-mil slit die at a temperature of 250° C. directly into the nip between an embossing roll with a 100 cell (i.e., boss) per square inch hexagonal pattern and a smooth surfaced chill roll. The nip is about 2.5 inches below the die lips, the embossing roll is maintained at a temperature of about 40° C. and the chill roll at 30° C. The nip pressure is 21 lbs. per linear inch, and the casting-embossing speed is 50 ft./min. The resulting embossed film is about 6-9 mils thick (at the thickest point, i.e., the ridge X) and has a 67% depth of embossment, i.e., the thickness of the film in the valley area Z separating the bosses is about 33% of the total thickness and the valley area is 36% of the total area. The ratio of the thickness of the film at the ridge X to the thickness at the center of a boss Y is 1.33. The embossed film is then drawn 3 times in the cross-machine direction on a tenter at 130° C. and then 3 times linearly between rolls using a hot feed roll at 160° C. The resulting biaxially oriented imperforate film has an attractive appearance similar to FIGS. 3 and 4 of the drawings and a ratio of the thickness of the film at the ridge X' to the thickness at the center of a depression Y' of 6.6. The thickness of the film, at the thickest point, is about 1.8 mils. It is relatively soft, quiet when shaken, has a tongue tear strength of 160 g./100 gage, an oxygen permeability of 650 cc./100 sq. in./24 hours, and a water vapor transmission of 1.5 g./100 sq. in./24 hours. A sample of the same copolymer cast as a flat film, biaxially oriented 3 times in each direction and having the same weight per square yard as the above biaxially embossed film has a tongue tear strength of 7 g./100 gage, an oxygen permeability of 350 cc./100 sq. in./24 hours and a water vapor transmission of 0.6 g./100 sq. in./24 hours.

A sample of ethylene-propylene copolymer having a crystallinity of about 25% and a molecular weight of approximately 200,000 and containing approximately 70% of repeating units derived from propylene monomer and 30% derived from ethylene monomer is embossed and biaxially drawn exactly as described above. The resulting film has an overall mottled appearance with no sharply defined ridges, depressions and valleys. The film has a tongue tear strength of 19 g./100 gage and an oxygen permeability of 450 cc./100 sq. in./24 hours.

A sample of high density polyethylene having a molecular weight of approximately 150,000 and a 78% crystallinity is embossed and biaxially drawn as described above. During the drawing, the film splits and forms an open net.

Example 2

This example shows the criticality of maintaining the proper embossing depth.

A sample of propylene homopolymer film having a molecular weight of approximately 270,000 and a 55% crystallinity is embossed to a 68% depth of embossment with 100 bosses per square inch. It has a thickness of 10 mils at the ridge X and a valley area of approximately 35% of the total. The embossed film is biaxially drawn three times in each direction—first in the linear direction at approximately 130° C. and then in the transverse direction in a tenter at 145° C. The resulting biaxially oriented imperforate film has an attractive appearance and is soft and quiet. It has a ratio of the thickness of the film at the ridge X' to the thickness at the center of a depression Y' of 8.3. The thickness of the film at the thickest point is about 2.5 mils. It has a tongue tear strength of 171 g./100 gage.

A sample of the above polymer is embossed and biaxially drawn in exactly the same way except the depth of embossment is 81% of the film's thickness. During drawing, the embossed film forms many splits and tears.

Another sample of the above polymer is embossed and biaxially drawn in exactly the same way except the depth of embossment is 31% of the film's thickness. The resulting biaxially oriented film has a ratio of the thickness of the film at the ridge X' to the thickness of the center of a depression Y' of 2.6 (outside of the range of this invention) and a tongue tear strength of 28 g./100 gage.

Examples 3–7

These examples show the criticality of maintaining the number of raised bosses below about 600 per square inch before drawing the embossed film.

Samples of the propylene homopolymer film described in Example 2 are embossed to a 69% depth of embossment with various numbers of hexagonal bosses per square inch, each separated by a valley area of about 25%, and then biaxially drawn three times in each direction exactly as described in Example 1. The number of bosses per square inch and the thickness of the embossed film before drawing, the $X'/Y'$ ratio and tongue tear strength for each oriented embossed film is tabulated below.

| Example: | Number of hexagonal bosses per square inch | Thickness of embossed film at X, mils | $X'/Y'$ ratio | Tongue tear strength, g./100 gage |
|---|---|---|---|---|
| 3 | 25 | 15 | 5.0 | 55 |
| 4 | 100 | 10 | 8.3 | 171 |
| 5 | 400 | 7.0 | 6.5 | 64 |
| 6 | 675 | 5.8 | 3.5 | 34 |
| 7 | 2,500 | 6.0 | 3.3 | 30 |

Examples 8–11

These examples show the criticality of maintaining a maximum thickness of 18 mils for the embossed undrawn film.

Samples of the propylene homopolymer described in Example 2 are embossed to an approximate depth of 65–70% with 100 hexagonal bosses per square inch, each separated by a valley area of approximately 30%, but varying the maximum thickness of the film (i.e., the thickness at the ridge X) and then biaxially drawing three times in each direction exactly as described in Example 1. The thickness of the embossed undrawn film at the ridge X and a description of the resulting embossed biaxially drawn film is tabulated below:

| Example: | Thickness of embossed at X, mils | Description |
|---|---|---|
| 8 | 27.3 | Bosses not oriented—film is pebbled with thick heavy dots. |
| 9 | 16.5 | Bosses biaxially oriented into depressions, strong ridges, good heavy film. |
| 10 | 10.0 | Excellent film, strong ridges, soft with good drape, biaxially oriented. |
| 11 | 7.3 | Do. |

Examples 12–18

These examples show the criticality of biaxially drawing within the range of amounts of this invention.

Samples of the propylene homopolymer film described in Example 2 are embossed exactly as described in Example 1 to an approximate depth of 65–70% with 100 hexagonal bosses per square inch to produce samples of embossed film having a thickness at the ridge X of approximately 10–12 mils and a valley area of approximately 35% of the total. Each sample of embossed film is biaxially drawn various amounts in each direction, also as described in Example 1. The amount of draw in each direction and a description of the resulting biaxially oriented film is tabulated below:

| | Amount of draw, times | | Description |
|---|---|---|---|
| Ex. | Machine | Cross-machine | |
| 12 | 2 | 2 | Bosses not oriented—film is pebbled with thick dots. |
| 13 | 2.6 | 2.6 | Bosses biaxially oriented into depressions, good film. |
| 14 | 3 | 3 | Excellent film, biaxially oriented. |
| 15 | 4 | 4 | Excellent, biaxially oriented film. |
| 16 | 5 | 5 | Do. |
| 17 | 4 | 3 | Do. |
| 18 | 6 | 6 | Film forms many splits during drawing and tears. |

What I claim and desire to protect by Letters Patent is:

1. A biaxially oriented embossed imperforate film having a thickness no greater than about 5 mils at the thickest point, prepared by embossing a sheet of propylene polymer having a crystallinity of from about 40% to about 65% and containing at least 80% of repeating units derived from propylene monomer, to a depth of from about 50% to about 75% of its maximum thickness with at least about 4 and not more than about 600 uniform raised bosses per square inch, each boss enclosed by a strong raised lip, the valley areas separating individual bosses constituting from about 20% to about 40% of the surface of the embossed film and subjecting the thus embossed film to a biaxial draw of at least about 2.5 times to about 5.0 times in both the machined and cross-machine direction.

2. The product of claim 1 wherein the biaxially oriented embossed imperforate propylene polymer film is a propylene homopolymer.

3. The process of preparing a biaxially oriented embossed imperforate propylene polymer film which comprises embossing a sheet of propylene polymer having a crystallinity of from about 40% to about 65% and containing at least 80% of repeating units derived from propylene monomer, to a depth of from about 50% to about 75% of its maximum thickness with at least about 4 and not more than about 600 uniform raised bosses per square inch, each boss enclosed by a strong raised lip, the valley areas separating individual bosses constituting from about 20% to about 40% of the surface of the embossed film and subjecting the thus embossed film to a biaxial draw of at least about 2.5 times to about 5.0 times in both the machine and cross-machine directions.

References Cited

UNITED STATES PATENTS

| | | | |
|---|---|---|---|
| 3,137,746 | 6/1964 | Seymour et al. | 264—289 X |
| 3,246,061 | 4/1966 | Blatz | 161—402 X |
| 3,387,077 | 6/1968 | Sammons et al. | 264—289 |
| 3,441,638 | 4/1969 | Patchell et al. | 264—289 X |
| 3,484,835 | 12/1969 | Trounstine et al. | 161—164 X |
| 3,574,809 | 4/1971 | Fairbanks et al. | 264—289 X |
| 3,636,147 | 1/1972 | Rowland | 264—284 |

GEORGE F. LESMES, Primary Examiner

R. J. ROCHE, Assistant Examiner

U.S. Cl. X.R.

161—165, 402, 164; 264—288, 293.